US006681970B2

United States Patent
Byrnes (10) Patent No.: US 6,681,970 B2
(45) Date of Patent: Jan. 27, 2004

(54) DEPLOYABLE ROOF MOUNTED EQUIPMENT RACK FOR TALL VEHICLES

(76) Inventor: James Michael Byrnes, 1111 W. Enclave Cir., Louisville, CO (US) 80027

( * ) Notice: Subject to any disclaimer, the term of this patent is extended or adjusted under 35 U.S.C. 154(b) by 91 days.

(21) Appl. No.: 10/095,744

(22) Filed: Mar. 13, 2002

(65) Prior Publication Data

US 2002/0125281 A1 Sep. 12, 2002

Related U.S. Application Data (60) Provisional application No. 60/274,854, filed on Mar. 9, 2001.

(51) Int. Cl.[7] .................................................. B60R 9/10
(52) U.S. Cl. ........................ 224/310; 224/326; 414/462
(58) Field of Search ................................. 224/310, 319, 224/321, 326; 414/462

(56) References Cited

U.S. PATENT DOCUMENTS

| | | | | |
|---|---|---|---|---|
| 2,746,628 A | * | 5/1956 | Neyra | 414/462 |
| 3,186,569 A | * | 6/1965 | Roux | 414/462 |
| 3,460,694 A | * | 8/1969 | Simms | 414/462 |
| 3,495,729 A | * | 2/1970 | Kruse | 224/310 |
| 4,081,095 A | * | 3/1978 | Wilburn et al. | 414/462 |
| 4,871,103 A | * | 10/1989 | Martinsson | 224/310 |
| 5,360,151 A | | 11/1994 | Fine | |
| 5,417,358 A | * | 5/1995 | Haselgrove | 224/310 |
| 5,421,495 A | | 6/1995 | Bubik | |
| 5,535,929 A | | 7/1996 | Neill | |
| 5,544,796 A | | 8/1996 | Dubach | |
| 5,673,831 A | | 10/1997 | Spratt | |
| 5,782,391 A | | 7/1998 | Cretcher | |
| 5,884,824 A | | 3/1999 | Spring | |
| 5,988,470 A | | 11/1999 | Siciliano | |
| 6,015,074 A | | 1/2000 | Snavely | |
| 6,520,393 B1 | * | 2/2003 | Ferguson | 224/321 |
| 2002/0014504 A1 | | 2/2002 | Hetu | |

* cited by examiner

Primary Examiner—Gary E. Elkins (57) ABSTRACT

A deployable roof mounted equipment rack apparatus especially suited for tall vehicles. The device contains a carriage that can be manually deployed from its horizontal position on the vehicle's roof to a near vertical position on either side of the vehicle using rollers guided by a fixed set of roof mounted tracks. The device is designed to accept commercially available equipment mounting hardware to allow attachment of various types of cargo. The carriage latches automatically when stowed on the rooftop tracks. The carriage can be removed from the vehicle once unlatched and readily collapsed to facilitate remote storage.

14 Claims, 6 Drawing Sheets

FIG. 7

DEPLOYABLE ROOF MOUNTED EQUIPMENT RACK FOR TALL VEHICLES

REFERENCE TO RELATED APPLICATIONS

This application is entitled to the benefit of Provisional Patent Application No. 60/274,854, filed Mar. 9, 2001.

FIELD OF THE INVENTION

This device relates to rooftop mounted equipment carriers for vehicles, specifically forms configured for improved accessibility.

BACKROUND OF THE INVENTION

For many years luggage racks on cars have been provided as a convenient way for hauling baggage and larger items better kept outside the vehicle such as sports equipment. Their design provides an accessible and sizeable platform when used on a typical sedan. However, more recently Sport Utility Vehicles (SUV's) and minivans have become increasingly popular. Although these vehicles are commonly used for carrying bicycles, ski's, luggage, lumber, etc., their roof height creates inconvenient if not difficult access for a typical roof rack. A 6-foot tall person may need to stand on a rear tire or door sill to gain full access to the roof of an SUV. One popular alternative to the roof rack has been the trailer-hitch mounted equipment rack. An issue with some of these design's however is that access to the rear door or hatch is complicated. A limitation with all of these designs is the inability to also pull a boat, trailer, etc. while using the hitch rack. Other lesser concerns with hitch racks are their impact on rear view visibility, and higher vulnerability to equipment damage in traffic and parking. A hitch rack is also unable to carry certain types of equipment such as kayaks and shell-type equipment carriers, as well as lumber, plywood, and other large items better carried outside the vehicle.

Existing patents granted over the recent years show that the access problem typical with roof racks on tall vehicles has been realized and addressed in many forms. There are more than two dozen patents citing roof mounted carriers that are specialized to provide improved convenience for mounting and dismounting of equipment. Many of the devices are complex assemblies of varying degrees using telescoping tracks such as U.S. Pat. Nos. 4,826,387 by Audet (1989), 5,884,824 by Spring (1999), 2002/0014504 by Hetu (2002), or U.S. Pat. No. 4,339,223 by Golze (1982). Some require multiple linkages such as U.S. Pat. Nos. 5,360,151 by Fine (1994), 5,544,796 by Dubach (1996), 5,360,150 by Praz (1993), or 5,988,470 by Siciliano (1999), while others are simpler but necessitate mounting hardware to the side of the vehicle as in U.S. Pat. Nos. 4,240,571 by Ernst (1980), 4,682,719 by Ernst (1987), and 4,887,750 by Dainty (1989) which makes them less practical for private vehicles. Some designs either would block a side door when lowered, or can only be used on vans without a side door as in U.S. Pat. Nos. 5,348,207 by Frank (1994), 5,535,929 by Neill (1996), 5,782,391 by Cretcher (1998), or 6,015,074 by Snavely (2000). Also, some devices are configured to carry specific equipment such as mainly bicycles like in U.S. Pat. Nos. 5,284,282 by Mottino (1994), 5,421,495 by Bubik (1995), and 5,709,521 by Glass (1998). Others employ drive systems using cables and/or motors as in U.S. Pat. Nos. 5,417,358 by Haselgrove (1995), 5,423,650 by Zerbst (1995), or 5,505,579 by Ray (1996). U.S. Pat. Nos. 4,728,244 by Stokkendal (1988) and 4,291,823 by Freeman (1981) use a much more complex configuration to attain the similar functional result of the device described here. U.S. Pat. No. 5,673,831 by Spratt (1997) effectively uses torsion springs to counterbalance the cargo load however the luggage rails of most vehicles may not accept the pull-out forces caused by reacting these torsion spring forces without augmenting their attachment to the vehicle. Neither the Spratt, Hetu, or forms of most of the aforementioned patents latch automatically when placed into their stowed positions, making inadvertent deployment a higher risk.

There appears to be a need at the consumer level for a roof mounted equipment rack that can provide several enhanced design and operational features over conventional racks. The device described herein was designed to the following driving requirements:

mechanically simple, i.e. few parts, no motors,
owner installed, i.e. no drilling, welding, special tools, complex assembly, or complex alignments,
simple to use, i.e. few actions required to stow and deploy,
simple to maintain, i.e. no periodic adjustments or realignments required,
lightweight for ease of use,
deployment and stowing/latching action not to be compromised by mud, snow, or ice,
operable by average height people standing on the ground with the device mounted on a typical SUV,
able to accept mounts for various sports equipment types, luggage, lumber, etc.,
low profile for accessibility to cargo even without deploying and for improved ceiling clearance,
deployable to either side of the vehicle and without having to unlatch both sides to initiate the deployment,
automatically latch when placed into the stowed position,
carriage to be easily removable and collapsible for off-vehicle storage and,
strong enough to accept loads while being used on an off-road vehicle with cargo attached.

SUMMARY OF THE INVENTION

The device is a vehicle roof mounted equipment rack designed primarily to provide increased accessibility to the cargo. It is generally intended for use with tall vehicles such as vans and SUV's but can be mounted to automobiles as well. The device consists of a movable carriage and a fixed set of roof mounted tracks. The tracks are positioned horizontally and perpendicular to the vehicle's longitudinal axis. The carriage is fitted with rollers that are guided by the tracks. The two track members have a specialized catch feature on each end that contain a latch pin for securing the carriage when in the roof mounted (stowed) position. The carriage is a rectangular shaped tubular frame assembly comprised mainly of two lateral members and two longitudinal members, all four joined by similar latch assemblies in each corner. Each latch assembly, as well as providing a structural element for joining a lateral member with a longitudinal member, contains a pair of rollers for traversing on the fixed track members and a hand-operated pivotable latch mechanism that interfaces with the track member latch pins. A novel feature is the ability for the carriage to be selectively deployed to either side of the vehicle, and moreover only the latches on the deployed side need to be actuated. This provides the option of loading the carriage from one side of the vehicle and unloading it from the other to the preference of the user. To operate, the carriage is firstly unlatched and manually pulled outward until it stops.

Secondly, the carriage is pivoted downward to a near vertical position against the side of the vehicle whereby the rack mounted equipment is now positioned at a convenient waist-to-chest high location. Stowing is the same steps in reverse except simpler as the carriage latches automatically when placed into the stow position on the rooftop.

Advantages

There are several important accomplishments and advantages this device holds over the prior art. They are summarized as follows:

1. Once unlatched, the carriage and its equipment mounts, such as aftermarket ski or bike carriers, can be lifted away and collapsed for storage. Only the two track members that contain minimal hardware remain attached to the vehicle.
2. The carriage rollers are not interlocked or captured into channels as with other concepts, thereby providing two important capabilities. The first as described previously is ease of removal of the carriage. Secondly is ease of use in snow and ice conditions that could inhibit motion in a captured roller system. Also, this configuration is not prone to collecting dirt and debris as with a channel configuration or the binding or rattling possible with telescoping tubes.
3. The latching concept is uniquely configured to also be tolerant of debris within the system, even ice or dirt, and still securely latch by employing a novel compensating design.
4. The carriage lateral members are each outfitted with two foot rest fittings. Each fitting is adjustable for height and position on the member. The feet are positioned to rest against the vehicle body or window moulding, allowing the carriage to be deployed without contacting the vehicle. This eliminates the need for mounting hardware to the side of the vehicle or from having to cantilever the load off of the roof as with other concepts.
5. The carriage can be deployed to either side of the vehicle, and only one side of the vehicle needs to be accessed to unlatch the carriage. This allows the user to selectively deploy the carriage to either side when factors such as traffic, parking proximity, side door accessibility, cargo placement on the rack, or user footing are considered.
6. The deployment operation involves only three actions: unlatch, pull outward, rotate downward. There are no motors, telescoping mechanisms, or winches to operate, and there are no latches to release on the far side of the vehicle.
7. The stowing action is simpler than deploying as the carriage latches automatically when set into position on the roof.
8. There is no hardware that mounts to the vehicle's roof or sides. The roof mount adapter assemblies attach the track members to the vehicle's existing longitudinal roof rails. There are no counterbalance springs as in some designs that would add complexity and impart high pull-out loads on the screws fastening the longitudinal roof rails to the vehicle.
9. The configuration is low profile. The design places the equipment mounts at a similar or lower height than the vehicles original equipment roof rack or typical aftermarket racks.

Further objects and advantages of the device such as ease of manufacture, ergonomic considerations, and broad applicability to vehicle types with minimal hardware changeout will be brought out upon review of the drawings and descriptions.

REFERENCE NUMERALS FOR THE FIGURES

1 End fitting, track member
2 Latch Pin, end fitting
3 Retaining Ring, latch pin
4 Cross Tube, track member
5 Bushing, roller shaft
6 Roller
7 Bushing, roller
8 Flat Washer, roller shaft
9 Retaining Ring, roller shaft
10 Spacer, roller shaft
11 Bushing, latch shaft
12 Torsion Spring, latch
13 Tension Pin, latch
14 Pivotable latch
15 Flat Washer, latch
16 Latch Shaft
17 Roller Shaft
18 Corner Fitting
19 Latch Release Lever
20 Lock Screw
21 Latch Handle, female
22 Latch Handle, male
23 Latch Lock
24 Retaining Clip, latch lock
25 Lock Hook
26 Bushing, Latch Shaft
27 Longitudinal Member, carriage
28 Hitch Pin, lateral member
29 Lateral Member Adapter, round bar
30 Lateral Member, round
31 Lateral Member Adapter, rectangular bar
32 Lateral Member, rectangular
33 Foot Rest Fitting
34 Lock Screw, foot
35 Adjustable Post 36 Roof Mount Adapter Assembly
37 Carriage
38 Track Member
39 Sports Equipment Mount (reference)
40 Vehicle's Existing Longitudinal Roof Rails (reference)

DESCRIPTION OF THE PREFERRED AND ALTERNATE EMBODIMENT

Figure 1:
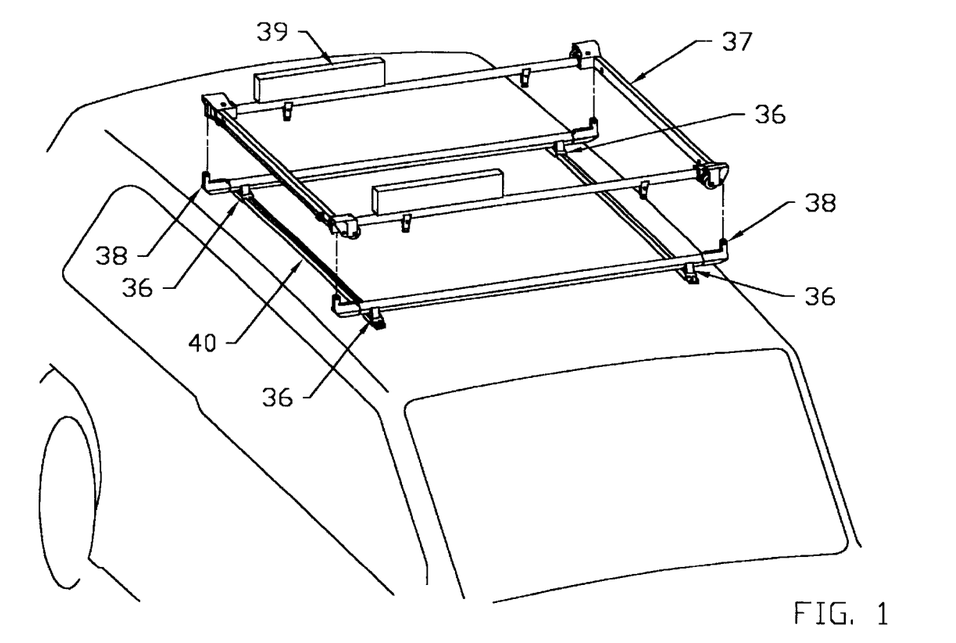
FIG. 1 is a partially exploded isometric view showing the carriage as a separate assembly from the roof mounted components.
Figure 2A:
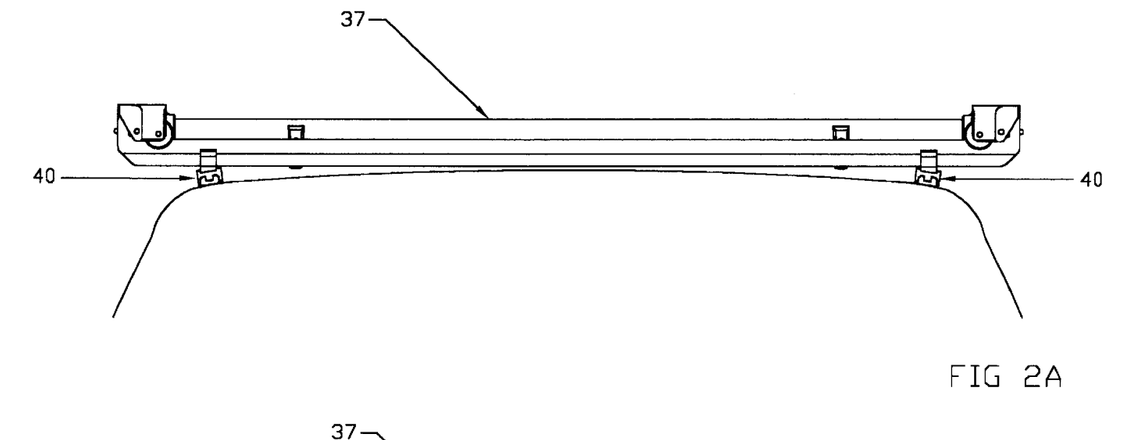
FIG. 2A is a front view of the carriage in its stowed position latched into the track members mounted on the vehicle's roof.
Figure 2B:
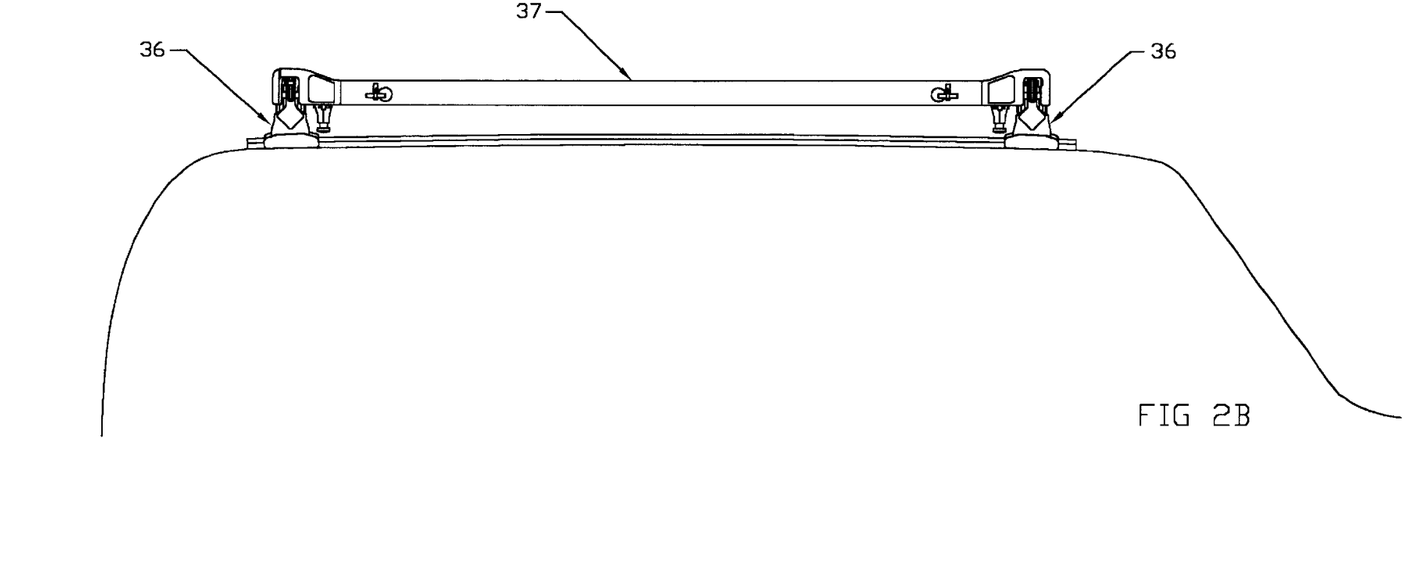
FIG. 2B is a side view of the carriage in its stowed position latched into the track members mounted on the vehicle's roof.
Figure 4A:
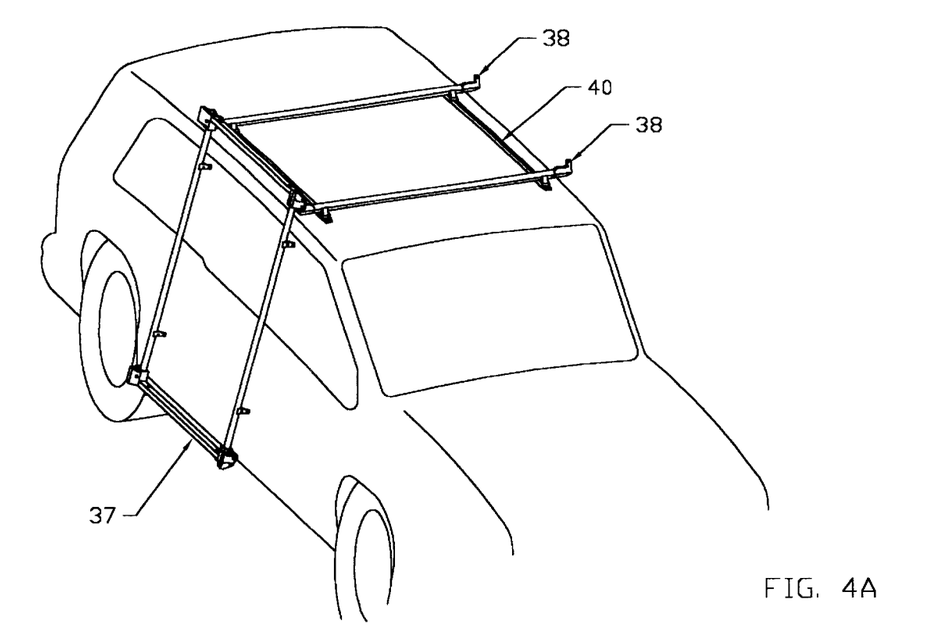
FIG. 4A is an isometric view of the carriage in its fully deployed position hinged off of the track member catch features.
Figure 4B:
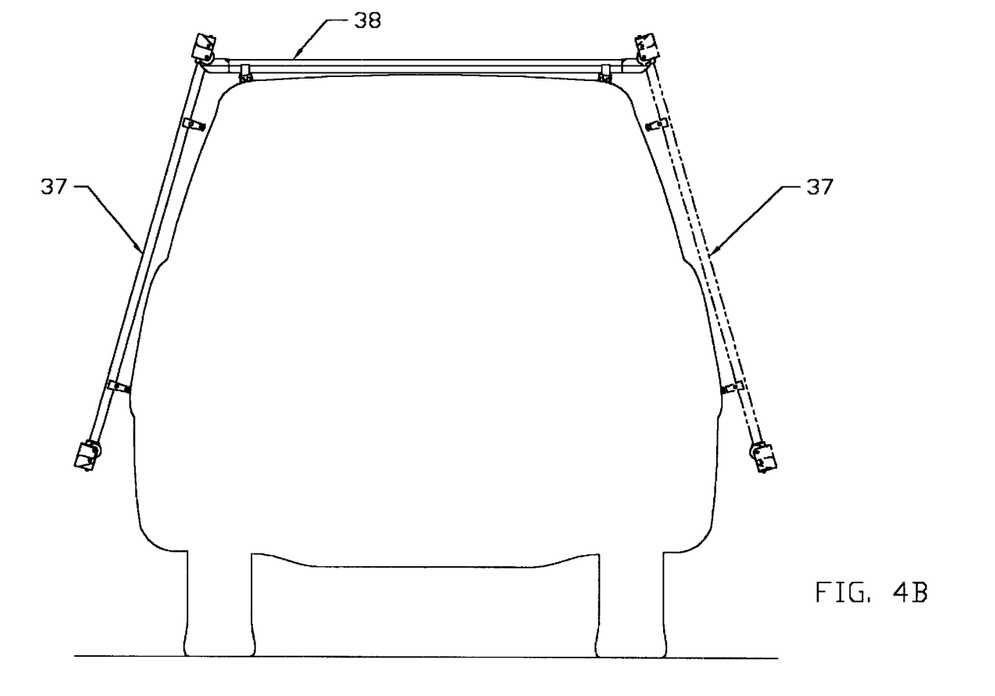
FIG. 4B is a front view of the carriage in its fully deployed position showing its contact with the side of the vehicle. Also depicted in hidden line reference is the alternate deployed position for the carriage.

Shown in FIG. 1, the roof mounted equipment rack assembly is comprised of a carriage 37, two track members 38, and four roof mount adapter assemblies 36. The device does not include equipment mounts in the design as the carriage 37 is specifically configured to accept common aftermarket types of mounts. The ski mounts 39 in FIG. 1 are shown for reference only as a typical user-mounted arrangement. In general, the preferred embodiment keeps as much of the componentry as practical on the carriage 37. Alternatively, it would be possible to simplify the carriage 37 with only latch pins and rollers in each of its corners and place the active latching hardware onto the track members 38 (not shown). FIGS. 2a and 2b shows the symmetry of the design about the geometric center of the equipment rack assembly in each view. A symmetrical configuration allows the carriage to be deployed to either side of the vehicle and simplifies the overall hardware set FIG. 4B is the same view as FIG. 2A but with the carriage 37 deployed to both sides of the vehicle.

The roof mounts 36 attach directly into the typical factory supplied longitudinal roof rails 40 that are shown for reference only. The design of the roof mount 36 varies as required to affix into the various shapes of the roof rails 40. When attached to the roof rails 40, the bases of the roof mounts 36 are restrained in all 6 degrees of freedom. The top of each roof mount 36 attaches to the track member 38 and provides the restraint for the vehicle roof rack assembly into the vehicle's roof rails 40. A two axis adjustment feature is provided within each roof mount 36 between it's base and head. This feature allows the base to conform to the typical multi-axis curvature of a vehicle's roof while the tops together define a common plane for the two track members 38. Together the two track members 38 and the four roof mounts 36 become a fixture on the vehicle's roof and are not part of the deployable portion of the device.

The two track members 38 mount perpendicular to the vehicle's longitudinal axis and parallel with respect to each other. They are identical in size and form in the preferred embodiment. The track members 38 each are comprised of a cross tube 4 and two end fittings 1. The cross tubes 4 are shown in the preferred embodiment as a square cross section rotated at 45 degrees relative to a horizontal axis although other shapes with an upward facing convex profile (not shown) are possible. This type of profile form provides a self-centering feature for the sets of carriage rollers 6 to follow across during stowing and deployment operations.

Figure 6A:
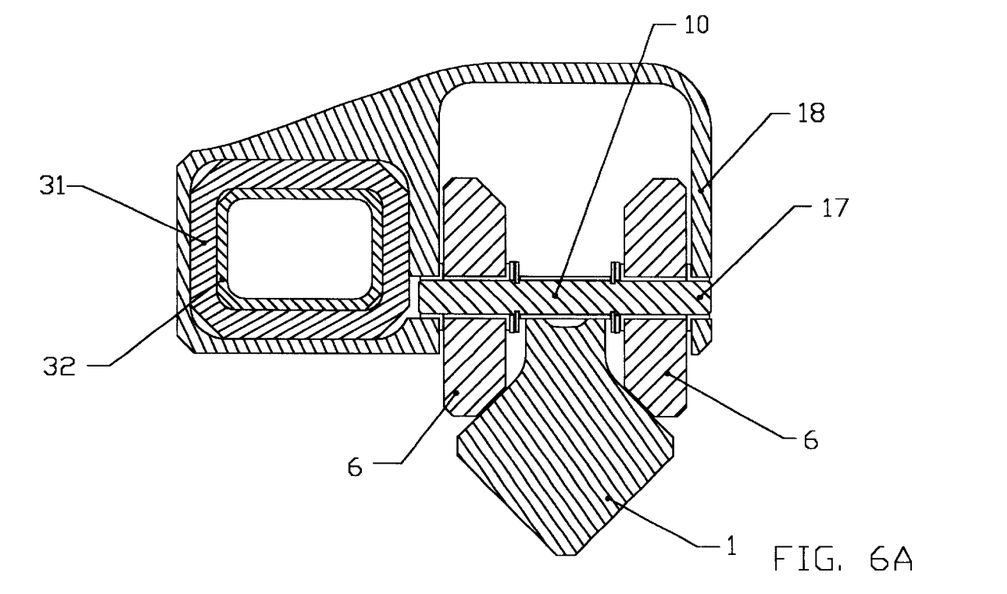
FIG. 6A is a cross sectional view through the rollers at one corner of the carriage.
Figure 6B:
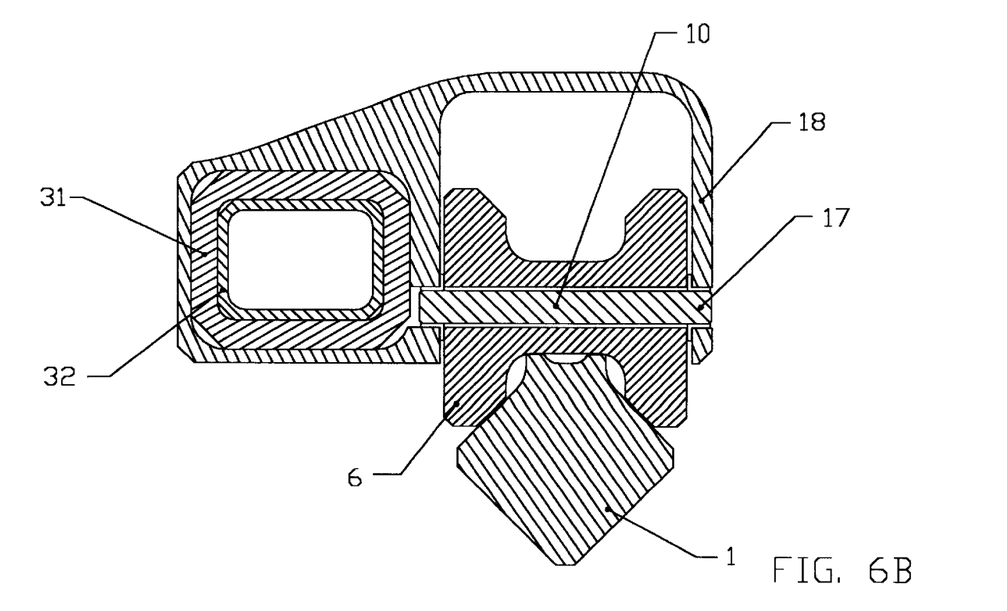
FIG. 6B is a cross sectional view through the alternate embodiment of a single roller configuration at one corner of the carriage.

FIG. 6A illustrates the interfaces of the rollers 6 and a corner fitting 18 with an end fitting 1 in the preferred embodiment. FIG. 6A also illustrates a central boss protrusion on the top of the end fitting 1 to offload the rollers 6 from the equipment loads when the carriage 37 is stowed. This boss allows the use of a compliant roller material for smooth rolling action on the track members without flat-spotting while stowed. Alternatively, a hard roller material could be used without the raised boss on the end fittings 1 but with a compromise in rolling action. FIG. 6B depicts the same section view as 6A with an alternative embodiment of a single hourglass-shaped roller shown.

Figure 5:
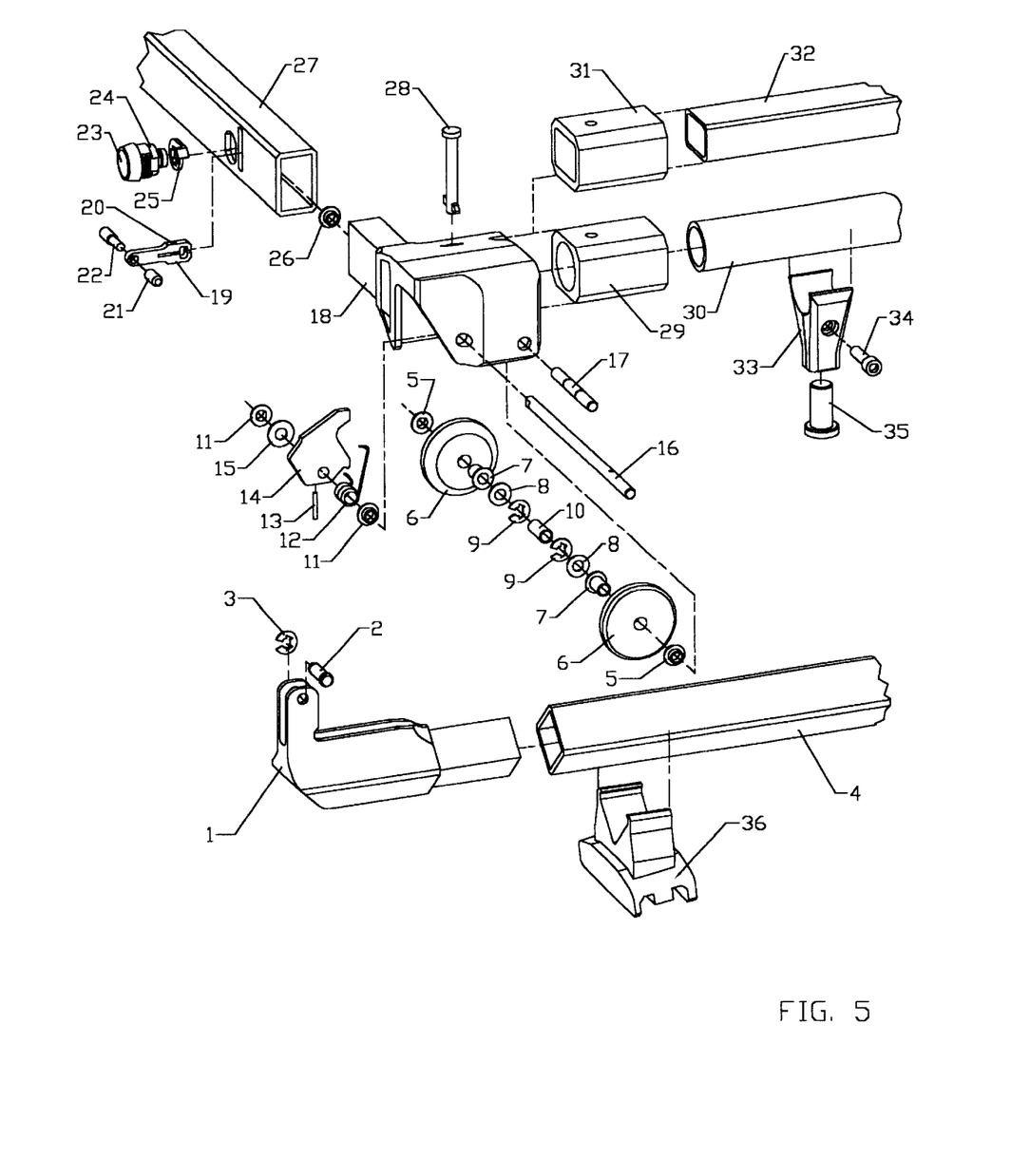
FIG. 5 is an exploded isometric view of the nearest of the four similar latch assemblies of the carriage and track member with a roof mount adapter assembly shown in FIG. 1.

FIG. 5 shows that the end fitting 1 is also configured with two vertical flanges which locate a latch pin 2. The latch pin 2 is shown restrained with a retaining ring 3 but can also be configured as a riveted or pressed assembly. The four latch pins 2 interface with four pivotable latches 14 to provide the restraint for the carriage 37 onto the two track members 38.

The carriage 37 shown in FIG. 1 is made up of two similar longitudinal members 27, two similar lateral members 30, and four latch assemblies, items 5 thru 18, as all shown in FIG. 5. The lateral members 30 are shown in two configurations, round, the preferred configuration and rectangular 32, one of several alternate tube sections possible. The tubes mount into a corner fitting 18 with a lateral member adapter (29 preferred or 31 an alternate example). The adapters 29/31 allows various tube configurations to mount into a single corner fitting 18 design. Alternatively, the adapters 29/31 could become integral with the lateral members 30/32, or eliminated and a single lateral member shape chosen. Both of the lateral members 30 and adapters 29 are restrained into the corner fitting 18 with a spring-actuated hitch pin 28. Other industry common types of quick-release fasteners could be used in an alternative embodiment. A quick-release type of pin facilitates breakdown of the carriage for compact storage off of the vehicle. The length of the lateral members 30 and the cross tubes 4 are dependent on the vehicle application. Fixing the length of one determines the length of the other due to the latch arrangement.

Each lateral member 30 locates two foot rest fitting assemblies made up of a foot rest fitting 33, lock screw 34, and an adjustable post with a compliant bumper 35 as shown in FIG. 5. The foot rest fitting 33 shown is a two piece housing separated along its vertical axis in a plane parallel to the lateral member 30. With the lock screw 34 loose, the foot rest fitting 33 can be slid along the lateral member 30 and the adjustable post 35 can be moved in or out of the foot rest fitting 33. The four foot rest fittings 33 are adjusted so the lower pair contact the vehicle in an acceptable location when the carriage 37 is deployed to each side of the vehicle. A wheel moulding, body crease, or window base as shown in FIG. 4B is preferred. Once positioned, the lock screws 34 are tightened which sets the foot rest fittings 33 laterally and locks the lengths of the adjustable posts 35.

Figure 7:
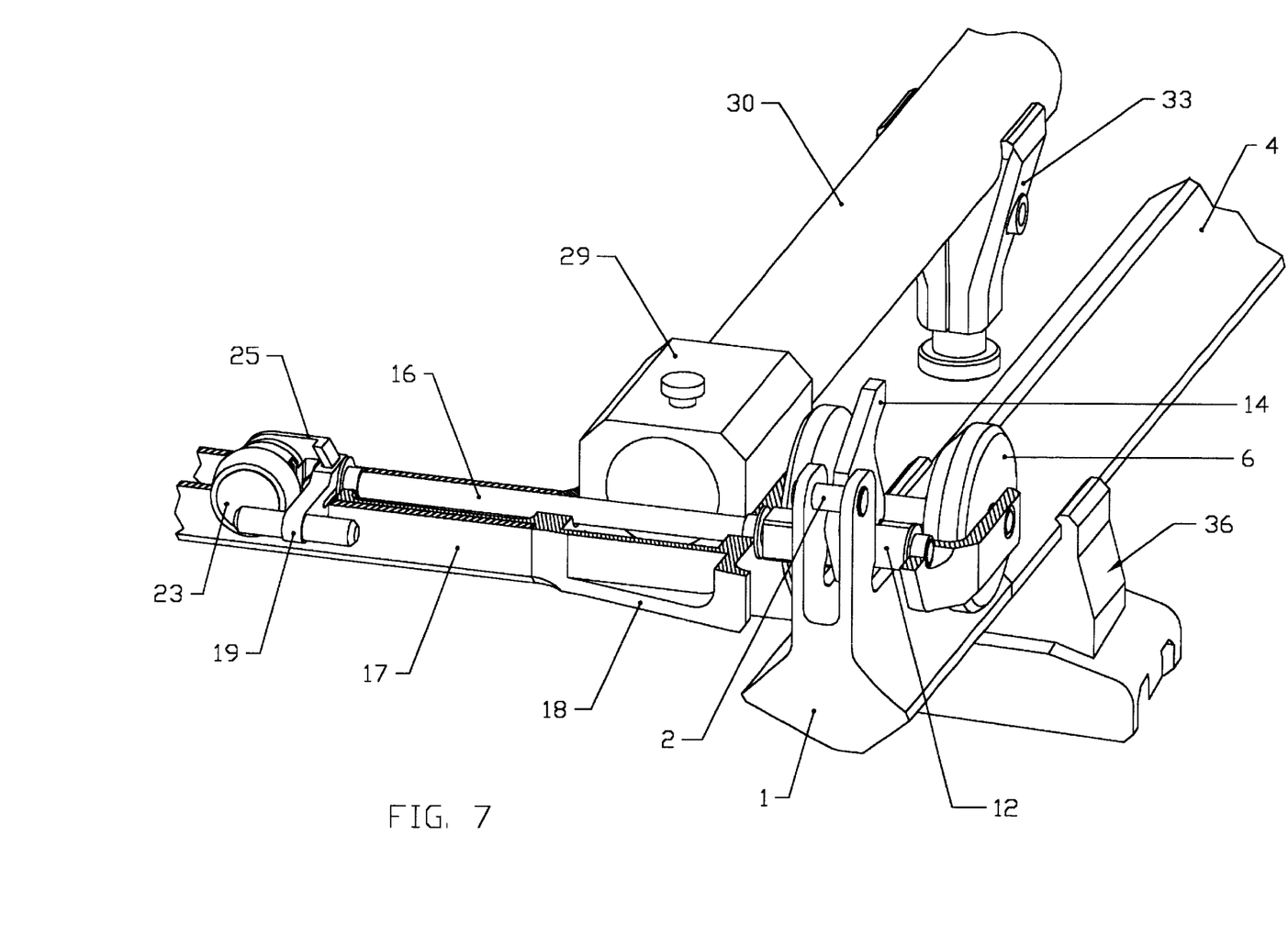
FIG. 7 is an isometric view of one latch assembly with the top half cut away to expose the inner detail, particularly to show how the pivotable latch interfaces with the latch pin.

Each latch assembly 5–18 is made up primarily of the corner fitting 18, two rollers 6 and associated shaft and bushings, and a pivotable latch 14 with its associated parts. The corner fitting 18 provides multiple functions. Firstly is to conjoin the lateral members 30 and longitudinal members 27. Secondly is to house the rollers 6 and thirdly is to locate the pivotable latches 14 and various latch mechanism componentry. FIG. 6A shows the rollers 6 mounted into the corner fitting 18 with a shaft 17, spacer 10, bushings 5,7 and hardware 8,9. Alternate forms of the design could reduce the number of parts by combining bushings and fasteners. The pivotable latch assembly shown in FIG. 5 consists primarily of a shaft 16 that mounts the pivotable latch 14 on one end and a release lever 19 on the other. The release lever 19 is keyed onto a flat on a shaft 16 and secured with a set screw 20. Knobs 21 and 22 are added onto the lever 19 for ease of operation. Alternative embodiments of the release lever could combine the 19, 21, and 22 parts into a single piece part. The shaft 16 is supported by two identical bushings 11 and a third bushing 26. Washer 15 isolates the pivotable latch 14 from a bushing 11. A tension pin 13 locks the pivotable latch 14 onto the shaft 16. Alternatively, the release lever 19 at each latch assembly 5–18 could be moved to the outboard face of the 18 corner fittings (not shown). Similarly, the two release levers 19 per side could be mechanically linked into a single latch per side in an alternative embodiment (not shown). FIG. 7 is a view of the latch assembly 5–18 with the upper half of the corner fitting 18 cut away to expose the pivotable latch 14 interface with the latch pin 2 when stowed. The pivotable latch 14 is specifically cam shaped so that with the assistance of a torsion spring 12 a constant torque against the latch pin 2 is provided. The relationship of the pivotable latch 14 profile and its pivot point on the shaft 16 axis relative to the latch pin 2 when stowed ensures that the carriage 37 is held securely. This described interface of features provides the self-compensating securing ability mentioned previously. The pivotable latch 14 profile also provides a stop feature that limits rotational motion by contacting the corner fitting 18. This stop sets the position of the pivotable latch 14 at a calculated angle in preparation for contacting the latch pin 2 while stowing.

The carriage's 37 vertical and lateral freedom is restrained with the four pivotable latches 14 wedged below the four latch pins 2 when stowed. The eight rollers 6 restrain the carriage 37 from fore and aft motions by their geometrical relationship of their profile interfacing with the cross tubes 4. A latch hook 25 in FIG. 7 mounted to a lock cylinder 23 provides a mechanical stop that would restrict the intentional movement of the release lever 19. The locks 23, clips 24, and latch hooks 25 are provided for security and are not necessary for providing a mechanically secure attachment of the carriage 37 to the track members 38. For reasons of symmetry two locks 23 per side are shown. Alternatively, only one lock 23 could be used per side for a total of two locks needed for the roof rack assembly. Because of the unique latching concept, only the operating side would need to be unlocked to deploy the carriage to that side, even if both sides of the carriage are locked.

OPERATION

Stowing of the Carriage

Figure 3:
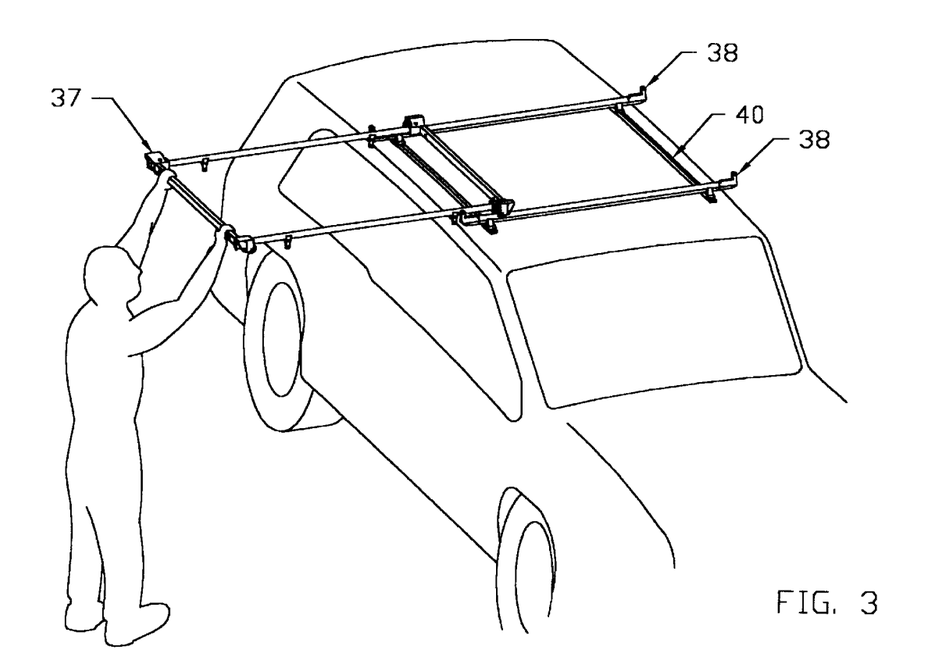
FIG. 3 is an isometric view depicting the user moving the carriage from its unlatched state to its deployed state prior to rotating the carriage downward.

Beginning with the carriage 37 removed from the vehicle, the user would lift it to a near vertical orientation with the longitudinal members 27 orientated horizontally. Next the user would set the four rollers 6 that are on the two high side corner fittings 18 over the flanges on the two close by end fittings 1. The rollers 6 engaging with the track member assemblies 38 would properly center and square the carriage 37. The carriage 37 would be available now for securing the equipment, bicycles, luggage, etc. in place. FIG. 3 shows how the user would next grasp the lower longitudinal member 27 and lift the carriage 37 to an approximately horizontal position. The carriage 37 would now be pushed toward the vehicle, allowing the rollers 6 to translate along the track member assemblies 38. As the four rollers 6 on the far side of the carriage 37 approach their end of travel, the boss feature on the end fittings 1 would un-weight the rollers 6 from the track member assemblies 38. The grasped side of the carriage 37 would be lifted slightly to clear the two near side end fitting flanges 1. Continuing motion beyond this point will force the two pivotable latches 14 on the far side latch assembly 5–18 into the latch pins 2 in the two respective track member assembly end fittings 1. The grasped side of the carriage 37 would be lowered, completing the stowing action as the two near side pivotable latches 14 are tripped and captured by the two near side latch pins 2. The latch action does not require the user to perform any deliberate action beyond placing the carriage 37 into the stowed position on the track member assemblies 38. Optionally, the user may decide at this time to engage the latch locks 23 for additional security.

Deployment of the Carriage

Upon selecting the preferred side of the vehicle to deploy the carriage 37 to, the user would unlock the latch lock 23 on only the selected side if engaged. Actuating the two near side release levers 19 by hand overcomes the torsion spring 12 torque and twists the pivotable latch 14 beyond the latch pin 2. The near side of the carriage 37 would be lifted slightly until the near side rollers 6 clear the flanges on the two near side end fittings 1. Next the carriage 37 would be pulled horizontally outward until it stops. FIG. 3 shows the positioning of carriage 37 as the far side catches on the near side track member's 38 catch features. Finally, the carriage 37 is rotated downward, allowing it to rest against the vehicle. FIG. 4A shows the carriage in the fully deployed position. The carriage 37 could now optionally be removed by lifting upward on it until the high side rollers 6 clear the end fitting flanges 1.

CONCLUSION

It can be concluded upon reviewing the aforementioned description that the invention is basically a simple device that meets the design goals previously explained. They are in summary: few moving parts, no motors, linkages or complex mechanisms, simple to install and operate, deployable to either side of the vehicle with only unlatching the chosen side, passively re-latchable, accept all reasonable forms of cargo, tolerant of snow and other debris, and the carriage to be readily removable from the vehicle. While the design described satisfies these parameters, many other forms of the invention can also be devised that are functional equivalents to the preferred embodiment. For example, the following configuration still fits into the spirit of the claimed invention: a design using round track members whose ends are fitted with latches instead of on the carriage, a carriage formed with all square tubes plus a diagonal brace, and a single roller per carriage corner. Accordingly, the scope of the invention is to be set in the claims that follow and not limited to the configuration illustrated and explained previously.

The claims are as follows:

1. A vehicle roof mounted equipment rack assembly having means for deployment to either side of said vehicle whereby equipment access is improved, comprising:
    a) two substantially equal length track member arranged parallel to each other and separated by a predetermined amount with means for mounting rigidly to said vehicle's roof, perpendicular to said vehicle's longitudinal axis, and both said track members supporting a catch feature of similar configuration at each proximate end;
    b) a carriage with means for latching to said catch features permitting mobility thereof upon release from said catch features, comprised of;
        at least four frame members arranged in a planar rectangular configuration and predetermined size principally set by the length and spacing of said track members, including at least two longitudinal members aligned substantially perpendicular to said track members and two lateral members aligned substantially parallel to said track members;
        latch assemblies forming each corner of said carriage providing several functions including:
            means to conjoin one end of said lateral member with one end of said longitudinal member,
            means for guidance of said carriage by said track members,
            means for securing said carriage to said catch features whereby an operator induced action of two of said latch assemblies located adjacent to side of said vehicle selected for said carriage to be deployed to releases said carriage to be firstly pulled outward along said track members toward said operator and secondly pivoted downward along said vehicle, and;
        at least one foot rest fitting affixed to and located specifically along each said lateral member, mounted in a cantilevered strut configuration comprised additionally with a compliant element fixed at the free end whereby said foot rest fittings firstly contact said vehicle's side surface upon deployment thereof.

2. The equipment rack of claim 1 wherein said track members are comprised of fixed componentry and all movable elements reside on the carriage.

3. The equipment rack of claim 2 wherein said catch features consist of a latch pin aligned principally to the horizontal, structurally supported near the ends of each said track member assembly, and centered a predetermined distance above the top surface thereof.

4. The equipment rack of claim 1 wherein means for guidance of said carriage by said track member is provided by at least one rotating element affixed to each said latch assembly.

5. The equipment rack of claim 4 wherein engagement of said rotating elements onto said track member assemblies when said carriage is deployed is maintained by gravity whereby said carriage is free to be lifted away from said vehicle.

6. The equipment rack of claim 4 wherein each said rotating element is comprised of a single roller shaped with a concave edge profile whereby said profile conforms to a convex profile of the generally upward facing surface of said track member assemblies.

7. The equipment rack of claim 4 wherein said rotating element is comprised of an opposed set of two rollers sharing a common shaft and suitably shaped with edge profiles whereby said profiles closely mate with a convex profile of the generally upward facing surface of said track members.

8. The equipment rack of claim 1 wherein means for securing said carriage to said catch features includes a pivotable latch mounted within each said latch assembly shaped with a predetermined cam profile and energized by a spring whereby placing said carriage into the stow position on the roof of said vehicle will securely engage all latches to all respective catch features.

9. The equipment rack of claim 8 wherein means for securing said carriage to said catch features further includes a lockable means against said pivotable latch whereby an additional mechanical device requires manual operation to enable deployment of said carriage.

10. The equipment rack of claim 8 wherein said pivotable latch is configurationally shaped and specifically located whereby rigid lateral and vertical restraint of said carriage is provided with tolerance to wear and buildup of debris within the componentry.

11. The equipment rack of claim 1 wherein said latch assemblies further provide a means to disengage from said lateral members thereof whereby said carriage may be readily dismantled.

12. The equipment rack of claim 1 wherein said foot rest fittings are independently adjustable in length and position along said lateral members whereby said foot rest fittings are set to contact a selected location on a side of said vehicle such as a body molding upon deployment of said carriage.

13. A vehicle roof mounted equipment rack assembly having means for deployment to either side of said vehicle whereby equipment access is improved, comprising:
   a) two substantially equal length track member arranged parallel to each other and separated by a predetermined amount with means for mounting rigidly to said vehicle's roof, perpendicular to said vehicle's longitudinal axis, and both said track members supporting a latch assembly of similar configuration at each proximate end;
   b) a carriage with means for interfacing to said latch assemblies permitting mobility thereof upon release from said latch assemblies, comprised of;
      at least four frame members arranged in a planar rectangular configuration and predetermined size principally set by the length and spacing of said track members, including at least two longitudinal members aligned substantially perpendicular to said track members and two lateral members aligned substantially parallel to said track members;
   corner fittings forming each corner of said carriage providing several functions including:
      means to conjoin one end of said lateral member with one end of said longitudinal member,
      means for guidance of said carriage by said track members,
      means for securing said carriage to said latch assemblies whereby an operator induced action of two of said latch assemblies located adjacent to side of said vehicle selected for said carriage to be deployed to releases said carriage to be firstly pulled outward along said track members toward said operator and secondly pivoted downward along said vehicle, and;
   at least one foot rest fitting affixed to and located specifically along each said lateral member, mounted in a cantilevered strut configuration comprised additionally with a compliant element fixed at the free end whereby said foot rest fittings firstly contact said vehicle's side surface upon deployment thereof.

14. A vehicle roof mounted equipment rack providing mechanisms to permit deployment to either side of said vehicle whereby equipment access is improved, comprising:
   a) two substantially equal length track member arranged parallel to each other and separated by a predetermined amount with bracketry for mounting rigidly to said vehicle's roof, perpendicular to said vehicle's longitudinal axis, and both said track members supporting a catch feature of similar configuration at each proximate end;
   b) a carriage with multiple latches to interface with said catch features permitting mobility thereof upon actuation, comprised of;
      at least four frame members arranged in a planar rectangular configuration and predetermined size principally set by the length and spacing of said track members, including at least two longitudinal members aligned substantially perpendicular to said track members and at least two lateral members aligned substantially parallel to said track members;
   latch assemblies forming each corner of said carriage providing multiple elements including:
      bracketry with receptacles to conjoin one end of said lateral member with one end of said longitudinal member,
      at least one roller aligned axially perpendicular to said lateral members and positioned to provide linear guidance of said carriage by said track members,
      a latching mechanism capable of restricting motion between said carriage and said catch features whereby an operator induced action of two of said latching mechanisms located adjacent to side of said vehicle selected for said carriage to be deployed to releases said carriage to be firstly pulled outward along said track members toward said operator and secondly pivoted downward along said vehicle, and;
   at least one foot rest fitting affixed to and located specifically along each said lateral member, mounted in a cantilevered strut configuration comprised additionally with a compliant element fixed at the free end whereby said foot rest fittings firstly contact said vehicle's side surface upon deployment thereof.

* * * * *